(12) United States Patent
van der Hijden et al.

(10) Patent No.: US 12,426,608 B2
(45) Date of Patent: *Sep. 30, 2025

(54) COMPOSITION COMPRISING AN OIL PHASE

(71) Applicant: Conopco, Inc., Englewood Cliffs, NJ (US)

(72) Inventors: Hendrikus Theodorus W M van der Hijden, Hoek van Holland (NL); Jacob Nijsse, Barendrecht (NL); Robert Vreeker, Melissant (NL); Jan Hendrik T Verbeek, Vlaardingen (NL); Seddik Khalloufi, Gatineau (CA)

(73) Assignee: Conopco, Inc., Englewood Cliffs, NJ (US)

( * ) Notice: Subject to any disclaimer, the term of this patent is extended or adjusted under 35 U.S.C. 154(b) by 1306 days.

This patent is subject to a terminal disclaimer.

(21) Appl. No.: 15/767,684

(22) PCT Filed: Oct. 18, 2016

(86) PCT No.: PCT/EP2016/074927
§ 371 (c)(1),
(2) Date: Apr. 12, 2018

(87) PCT Pub. No.: WO2017/067901
PCT Pub. Date: Apr. 27, 2017

(65) Prior Publication Data
US 2018/0310586 A1     Nov. 1, 2018

(30) Foreign Application Priority Data
Oct. 19, 2015  (EP) ..................... 15190379

(51) Int. Cl.
*A23D 9/007* (2006.01)
*A23D 7/005* (2006.01)
*A23D 7/02* (2006.01)
*A23D 9/02* (2006.01)

(52) U.S. Cl.
CPC .......... *A23D 9/007* (2013.01); *A23D 7/0056* (2013.01); *A23D 7/02* (2013.01); *A23D 9/02* (2013.01)

(58) Field of Classification Search
CPC ........ A23D 9/007; A23D 7/0056; A23D 7/02; A23D 9/02
USPC ....................................................... 426/601
See application file for complete search history.

(56) References Cited

U.S. PATENT DOCUMENTS

| 3,539,365 A | 11/1970 | Durand et al. |
|---|---|---|
| 4,378,381 A | 3/1983 | Turbak et al. |
| 4,923,981 A * | 5/1990 | Weibel .................... A21D 2/188 424/439 |
| 5,366,750 A | 11/1994 | Morano |
| 5,441,753 A | 8/1995 | McGinley et al. |
| 5,616,358 A | 4/1997 | Taylor et al. |
| 5,736,177 A | 4/1998 | McGinley et al. |
| 7,074,300 B2 | 7/2006 | Lundberg et al. |
| 7,094,317 B2 | 8/2006 | Lundberg et al. |
| 8,349,342 B2 | 1/2013 | Lobee et al. |
| 10,172,381 B2 | 1/2019 | Vrljic et al. |
| 2005/0163735 A1 | 7/2005 | Martinez-Force et al. |
| 2006/0078655 A1 | 4/2006 | Plank et al. |
| 2008/0193590 A1 | 8/2008 | Lundberg |
| 2010/0291280 A1 | 11/2010 | Blijdenstein et al. |
| 2011/0281015 A1 | 11/2011 | Higgins et al. |
| 2012/0090192 A1 | 4/2012 | Oevreboe et al. |
| 2013/0202771 A1 | 8/2013 | Corbin et al. |
| 2014/0242220 A1* | 8/2014 | Chen ...................... A23L 33/22 426/71 |

FOREIGN PATENT DOCUMENTS

| EA | 0533147 | 3/1993 | |
|---|---|---|---|
| EP | 3364767 | 2/2020 | |
| WO | WO9748402 | 12/1997 | |
| WO | WO0218486 | 3/2002 | |
| WO | WO2004044285 | 5/2004 | |
| WO | WO2008062057 | 5/2008 | |
| WO | WO2012084427 | 6/2012 | |
| WO | WO2014095323 | 6/2014 | |
| WO | WO2014095342 | 6/2014 | |
| WO | 2015128155 | * 9/2015 | ............ A23L 1/052 |
| WO | 2017067901 A1 | 4/2017 | |

OTHER PUBLICATIONS

Co-pending Application, Hendrikus Theodorus W. M. van der Hijden,, Composition Comprising an Oil Phase.
Changquan (Calvin) Sun; J. of Pharma. Sciences; True Density of Microcrystalline Cellulose; 2005; pp. 2132-2134; 94(10).
Soybean oil; Wikipedia; 2020; pp. 1-6.
L. Gu et al.; Structure Function Relationships of Highly Refined Cellulose, pp. 1707-1712, 2001; 2001; 1707-1712.
Lundberg, Brock; Development of a new process to make highly refined cellulose, pp. 1-130, Jan. 2000; Jan. 2000; 1-130.
Gas adsorption: Determination of the specific surface area, pp. 1, Oct. 25, 2021; Oct. 25, 2021; 1.
Citri fi Users Guide, Created by Nature enhanced by Fiberstar, p. 1-39, Jan. 2011; Jan. 2011; 1-39.
The Wayback Machine; Screenshot of Fiberstar Website, p. 1, Aug. 31, 2011; Aug. 31, 2011; 1.
The Wayback Machine; Thickening and Emulsion Stabilization, p. 1-2. Sep. 27, 2021; Sep. 27, 2021; 1-2.

(Continued)

Primary Examiner — Nikki H. Dees
Assistant Examiner — Philip A Dubois
(74) Attorney, Agent, or Firm — Ipsilon USA—NLO

(57) ABSTRACT

The present invention relates to a composition comprising an oil phase and a fibrous preparation of delaminated cell wall material dispersed in said oil phase, wherein the cell wall material is sourced from plant tissue, and wherein said fibrous preparation has a specific surface area corresponding to an $S_{BET}$ of at least 5 m$^2$/g. The invention also relates to a method to prepare such compositions and the use of said cell wall material to structure the oil phase of a composition comprising an oil phase.

11 Claims, No Drawings

(56) References Cited

OTHER PUBLICATIONS

The Wayback Machine; Partial Replacement of Oil and Fat with Citrifi, p. 1-3, Sep. 27, 2021; Sep. 27, 2021; 1-3.
The Wayback Machine; What is citri-fi, p. 1-3, Oct. 14, 2021; Oct. 14, 2021; 1-3.
B. Lundberg, Thesis, Development of a new process to make highly refined cellulose, M.S. Univ of MN, pp. 2-3, 2000.
Mini-Encyclopedia of Papermaking Wet-End Chemistry; Fibrillation delamination of cell wall, p. 1; 1.
Oxford Reference; Defibrillation, p. 1, 2021; 2021; 1.
Purcell; Effects of Diffusion on Free Precession in Nuclear Magnetic Resonance Experiments; Physical Review, vol. 94, Issue 3, pp. 630-638; 1954; 1954; 630-638.
Meiboom et al.; Modified Spin-Eco Method for Measuring Nuclear Relaxation Times; Review of Scientific Instruments; vol. 29, Issue 8; pp. 688-691; 1958; 1958; 688-691.
Pedersen et al; Towards Rapid and Unique Curve Resolution of Low-Field NMR Relaxation Data Trilinear Slicing versus Two-Dimensional Curve Fitting; Journal of Magnetic Resonance; vol. 157; pp. 141-155; 2002; 2002; 141-155.
IPRP2 in PCTEP2016074918, Sep. 22, 2017.
IPRP2 in PCTEP2016074927, Jan. 23, 2018.
Search Report and Written Opinion in EP15190379, Apr. 21, 2016.
Search Report and Written Opinion in EP15190392, Apr. 20, 2016.
Search Report and Written Opinion in PCTEP2016074918, Jan. 23, 2017.
Search Report and Written Opinion in PCTEP2016074927, Jan. 25, 2017.
Written Opinion 2 in PCTEP2016074927, Sep. 18, 2017.
Co-pending Application, Hendrikus Theodorus W. M. van der Hijden,, Composition Comprising an Oil Phase, Oct. 19, 2015.

* cited by examiner

COMPOSITION COMPRISING AN OIL PHASE

CROSS REFERENCE TO RELATED APPLICATIONS

The present application is a U.S. National Phase Application under 35 U.S.C. § 371 of International Application No. PCT/EP2016/074927, filed on Oct. 18, 2016, which claims priority to European patent application No. 15190379.6 filed on Oct. 19, 2015, the contents of which are incorporated herein in their entireties.

FIELD OF THE INVENTION

The present invention relates to a composition comprising an oil phase, in particular to a composition comprising a structured oil phase. The invention also relates to a method for preparing a composition comprising a structured oil phase.

BACKGROUND TO THE INVENTION

Compositions comprising an oil phase have many applications For example, there are many food compositions that consist essentially of such oil phases, such as for example many shortening compositions. There are even more food compositions, that have an oil phase in combination with other phases. In either case there is a general desire to control the rheological or textural properties of such compositions by structuring the oil phase. Traditionally compositions such as shortenings, butters, margarines and similar products have been structured by the use of at least a portion of hard fat in the oil phase. However, it is desirable to reduce the amount of hard fat required to structure such oil phases, because hard fat is frequently associated with increased cost, limited natural availability from species that have undesirable environmental impact (such as palm oil), or adverse effects on consumer health.

US 2011/0281015 A1 discloses shortening compositions comprising hard fat, liquid oil and cellulose fibre. However, satisfactory structuring requires relatively high amounts of about 4 wt % or more of the used cellulose fibres, which still need to be combined with appreciable amounts of hard fat. Likewise, US 2013/0202771 A1 discloses fat spreads with an oil and a water phase, in which the oil phase comprises cellulose fibres. The structuring of the example spreads provided in that document also depends on the presence of hard fat (e.g. hydrogenated fats) and relatively high amounts of cellulose fibres.

It is disclosed in U.S. Pat. No. 4,378,381 that cellulose can be shear-treated in aqueous media to yield microfibrillated cellulose, which has the capability of enhancing the homogeneity and stability of a wide variety of suspensions. However, due to the hydrophilicity of the cellulose fibres, the use of the microfibrillated cellulose is generally considered to be limited to aqueous phases. For example, EP 0 533 147 A1 discloses how microfibrillated cellulose can be used to increase the water retention of a margarine composition, by simultaneously adding (aqueous) microfibrillated cellulose and the liquid that forms the aqueous phase to a fat and/or oil component.

WO 201 5/1 281 55 A1 relates to a preparation of plant parenchymal cell wall clusters.

WO 2004/044285 A2 relates to a highly refined cellulose product comprising microfibres, having a water retention capacity of at least about 20 g $H_2O$ per gram of dry product.

WO 2008/062057 A1 relates to a composition comprising citrus fibre having a water binding capacity of from 7 to 25 (w/w) and native starch.

US 2008/193590 A1 relates to an edible food product comprising highly refined cellulose.

WO 02/18486 discloses a way in which "high surface area cellulose" can be used for the rheological modification of water-immiscible liquids, such as oils. The high surface area cellulose can be bacterial cellulose, or plant-derived cellulose of which the surface area is increased, e.g. by activation using high pressure homogenisation. In order to make the high surface area cellulose suitable for use in oils, surfactants such as dodecylamine and fatty acid derivatives and/or polymers such as poly(vinyl pyrrolidone) graft hexadecene are combined with the aqueous cellulose. However, large amounts of typically about twice the weight of the cellulose of these surfactants and/or polymers appear to be required to make them dispersible in oil. Such amounts and types of surfactants/polymers are undesirable in many applications, especially in food applications.

Therefore, it is an object of the present invention to provide a composition that overcomes one or more of the problems observed in the prior art as described above.

It is an object of the present invention to provide alternative ways of modifying the rheology and/or structuring oil phases.

It is a particular object of the present invention to provide structuring or rheological modification to oil phases whilst reducing or even avoiding the need to use hardstock fat or other undesirable rheology modifiers or additives.

It is another object of the present invention to provide compositions comprising an oil phase with improved rheological properties or improved structuring, preferably whilst such compositions comprise relatively less or substantially no hardstock fat.

It is another object of the present invention to provide a method for preparing compositions comprising an oil phase, wherein the oil phase has controllable rheological properties.

It is a particular object of the present invention to provide a method for preparing a composition comprising a structured oil phase, with a reduced amount of hardstock fat or even without hardstock fat.

DEFINITION OF THE INVENTION

We have surprisingly found that one or more of these objects can be achieved by the present invention. In particular, we found that fibrous preparations of delaminated plant cell wall material can be used to modify the rheological properties of oil compositions, provided that the preparation has sufficient openness and/or has a sufficiently large specific surface area. No additives, or surfactants are required and hard fats or synthetic polymers may be reduced or even left out of the composition. This is unexpected in view of the generally hydrophilic nature of activated plant cell wall material.

The properties of the fibrous preparation required to structure an oil composition or modify its rheological properties can be expressed in terms of its specific surface area. Accordingly, in a first aspect the invention provides a composition comprising an oil phase and a fibrous preparation of delaminated cell wall material dispersed in said oil phase, wherein the cell wall material is sourced from plant tissue, and wherein said fibrous preparation has a specific surface area corresponding to an $S_{BET}$ of at least 5 $m^2/g$.

We found that by delaminating cell wall material (for instance by subjecting it to shear forces) in aqueous medium, its available surface area in the medium can be increased to reach the required level of openness. The delaminated cell wall material can surprisingly be used in an oil phase if it is properly dried. Therefore, according to a second aspect, the invention provides a composition comprising an oil phase and a fibrous preparation of delaminated cell wall material dispersed in said oil phase, wherein the cell wall material is sourced from plant tissue, and wherein said fibrous preparation is a dried preparation of delaminated plant cell wall material retaining the openness of said material in the aqueous delamination medium.

According to a third aspect of the invention, there is provided a method for the preparation of a composition comprising a structured oil phase, wherein the method comprises the steps of
  a. providing cell wall material, wherein the cell wall material is sourced from plant tissue;
  b. providing at least part of the oil phase;
  c. delaminating said cell wall material in an aqueous medium;
  d. drying the dispersed delaminated cell wall material so as to obtain a dried fibrous preparation of delaminated cell wall material with an $S_{BET}$ of at least 5 m$^2$/g; and
  e. combining the dried preparation with said at least part of the oil phase.

Consequently, according to a fourth aspect, the invention provides a composition obtainable by the method according to the third aspect of the invention.

According to a fifth aspect, the invention also provides use of a fibrous preparation of delaminated cell wall material to structure the oil phase of a composition comprising an oil phase, wherein the cell wall material is sourced from plant tissue, and wherein said fibrous preparation has a specific surface area corresponding to an $S_{BET}$ of at least 5 m$^2$/g.

According to a sixth aspect, the invention also provides use of a fibrous preparation of delaminated cell wall material to structure the oil phase of a composition comprising an oil phase, wherein the cell wall material is sourced from plant tissue, and wherein said fibrous preparation is a dried preparation of delaminated plant cell wall material retaining the openness of said material in the aqueous delamination medium.

DETAILED DESCRIPTION OF THE INVENTION

Any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Moreover, weight percentage (wt. %) is based on the total weight of the product unless otherwise stated. Except in the operating and comparative examples, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient temperature is defined as a temperature of about 20 degrees Celsius.

In the context of this description the terms 'fat' and 'oil' are used interchangeably, unless specified otherwise. Where applicable the prefix 'liquid' or 'solid' is added to indicate if the fat or oil is liquid or solid at ambient temperature as understood by the person skilled in the art. The term 'hardstock' refers to a fat that is solid at ambient temperature.

Composition Comprising an Oil Phase

The present invention relates to a composition comprising an oil phase. In the context of the present invention, an oil phase is understood to be a phase whose principal components are hydrophobic substances of which typically a part is liquid at room temperature. For the avoidance of doubt, the below explanation, exemplification and preferences regarding oil compositions applies to the oil composition in any aspect of the present invention. Structuring and or rheological modification is particularly desirable for oil phases which—without the presence of a structurant such as for example the fibrous preparations of the present invention—would have been liquid at the temperature at which they are used. Thus, the oil phase typically comprises a hydrophobic carrier. Preferably, the hydrophobic carrier is an edible oil, a paraffin, a silicone oil or a combination thereof.

The composition of the invention preferably is an edible composition. The oil phase therefore preferably is an edible oil phase. Consequently, the hydrophobic carrier preferably is an edible oil.

Thus, the edible oil preferably is an edible triglyceride-based oil as understood by the person skilled in the art. The terms 'triacylglycerols', TAGs', and 'triglycerides' are used interchangeably; they refer to esters of glycerol and three fatty acids. The fatty acid (moieties) of the TAGs may vary in length. The length of a fatty acid is commonly indicated by their carbon number. The fatty acid (moieties) may be saturated, monounsaturated or polyunsaturated. Examples of sources of conventional edible oils and fats include coconut oil, palm kernel oil, palm oil (and fractions thereof including palm olein and palm stearin), marine oils (including fish oil), lard, tallow fat, butter fat, soybean oil, safflower oil, cotton seed oil, rapeseed oil, linseed oil, sesame oil, poppy seed oil, corn oil (maize oil), sunflower oil, peanut oil, rice bran oil, olive oil, algae oil, shea fat, and alanblackia and blends thereof. For the purpose of this invention, algae oils are considered vegetable oils.

The hydrophobic carrier preferably is a liquid edible oil. Preferably at least 50 wt % of the liquid oil (based on total amount of liquid oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

Preferably the liquid oil is selected from soybean oil, sunflower oil, rape seed (canola) oil, cotton seed oil, peanut oil, rice bran oil, safflower oil, palm olein, linseed oil, fish oil, high omega-3 oil derived from algae, corn oil (maize oil), sesame oil, palm kernel oil, coconut oil, olive oil, and combinations thereof. More preferably the liquid oil is selected from soybean oil, sunflower oil, rape seed oil, corn oil (maize oil), olive oil, linseed oil, palm olein and combinations thereof.

In view of the above, it is preferred that the hydrophobic carrier preferably is a triglyceride carrier, a diglyceride carrier or a mixture of triglycerides and diglycerides. Such a carrier preferably also is edible.

The present invention is not limited to edible compositions. In particular in the context of personal care compositions, the oil composition may also include one or more paraffins, or silicone oils as at least part of the hydrophobic carrier.

The oil phase of the composition according to the present invention preferably comprises between 1 and 99.5 wt-%, more preferably between 10 and 99.0 wt-%, even more preferably between 50 and 98.5 wt-% and still more preferably between 75 and 98.0 wt-% of the hydrophobic carrier with respect to the weight of the oil phase. In view of potential applications in food compositions, the oil phase preferably comprises at least 80 wt-% of edible oil as the hydrophobic carrier, more preferably at least 90 wt-%, even more preferably at least 95% and still more preferably at least 98 wt-% of of edible oil. For many applications, the oil phase preferably consists essentially of an edible oil as the hydrophobic carrier and of the fibrous preparation.

Cell Wall Material

The present invention involves a fibrous preparation of delaminated cell wall material, wherein the cell wall material is sourced from plant tissue. Thus, the main component of the fibrous preparation is cell wall material.

For the purpose of the invention "cell wall material" is defined as the cell wall material from which essentially all cold water soluble components have been removed, i.e. at a temperature of around 20 degrees Celsius. This can easily be achieved by washing with water.

The cell wall material is sourced from plant tissue. Plant tissue may contain primary cell wall material and/or secondary cell wall material, depending on the type of plant and the type of tissue of a certain plant species. Both primary and secondary cell wall material generally comprise microfibrils. Therefore, the cell wall material may be primary cell wall material, secondary cell wall material or a combination thereof.

Preferably, the cell wall material is primary cell wall material, because, generally, for primary cell wall material less shear is required to arrive at the state of delamination and/or defibrillation that provides the fibrous preparation with its beneficial properties. Therefore, the fibrous preparation of the present invention preferably is a fibrous preparation of primary cell wall material, wherein the primary cell wall material is sourced from plant parenchymal tissue.

Such primary cell wall material is sourced (i.e. prepared) from plant parenchymal tissue. The microfibrils in the fibrous preparation used in the present invention are preferably microfibrils obtained from primary cell wall material. The source of the plant parenchyma cells may be any plant that contains plant parenchyma cells having a cellulose skeleton. A plant cell wall typically contains cellulose and hemicellulose, pectin and in many cases lignin. This contrasts with the cell walls of fungi (which are made of chitin), and of bacteria, which are made of peptidoglycan. Primary plant cell walls contain lignin only in minor amounts, if at all. The primary cell wall material used in the composition according to the invention may comprise some lignin, like less than 10 wt %, more preferably less than 2 wt % calculated on total amount of cell wall material, but preferably does not contain substantial amounts of lignified tissue. Preferably the primary cell wall material consists essentially of non-lignified tissue as understood by the skilled person in the area of plant biology.

Preferably the source of cell wall material is selected from parenchymal tissue from fruits, roots, bulbs, tubers, seeds, leaves and combination thereof; more preferably is selected from citrus fruit, tomato fruit, peach fruit, pumpkin fruit, kiwi fruit, apple fruit, mango fruit, sugar beet, beet root, turnip, parsnip, maize, oat, wheat, peas and combinations thereof. Even more preferably, the source of cell wall material is selected from citrus fruit, sugar beet, sugar cane, tomato fruit and combinations thereof. A most preferred source of cell wall material is parenchymal tissue from citrus fruit. Consequently, it is preferred that the cell wall material is citrus fibre, tomato fibre, sugar beet fibre, sugar cane fibre or a combination thereof and even more preferably the cell wall material is citrus fibre.

The cell wall material may optionally have undergone several pre-treatment steps before it is brought in any activated or defibrillated state. Such pre-treatments include but are not limited to heating, cooking, washing, refining, depectinating.

The fibrous preparation of cell wall material preferably comprises at least 70 wt-% of cell wall material, more preferably at least 80 wt-% and even more preferably at least 90 wt-% with respect to the weight of the fibrous preparation. Here, the wt-% of the fibrous preparation is based on the dry weight of the cell wall material from which essentially all cold water soluble components have been removed (i.e. the insoluble fraction, which is also understood as the fibre fraction). The preparation may also comprise some water, typically residual water. Consequently, it is preferred that the fibrous preparation essentially consists of cell wall material and water.

Microfibrils

In the context of the present invention, the microfibrils present in or derived from the cell wall material, are the strongly self-associated fibrous structures typically found in plant cell walls. In the native plant tissue, they are conventionally present in the form of aggregates from a few tens of nanometres to a few micrometres in diameter. These aggregates include elementary fibrils of typically about 3.5 nm in diameter as described by Chinga-Carrasco et al (Nanoscale Research Letters 2011, 6:417). Microfibrils as found in the native plant tissue generally comprise cellulose as their key constituent. In addition, the microfibrils may also include other polysaccharides such as pectin and hemicellulose. It is believed that the beneficial properties of the fibrous preparation used in the present invention relate to the structure and rigidity of the cell wall material, due to the typical presence of microfibrils in the cell wall material.

Preferably, the cell wall material as used in the fibrous preparation is obtained from the cell wall material by removing soluble and unbound sugars, protein, polysaccharides, oil soluble oils, waxes and phytochemicals (e.g. carotenoids, lycopene). This is suitably achieved using well known techniques including cutting up the cell wall material, heating, washing, centrifugation, decanting and drying as is well-known to the skilled person.

Preferably the cell wall material comprises at least 50 wt-% of microfibrils, more preferably at least 60 wt %, even more preferably at least 70 wt %, still more preferably at least 80 wt %, even still more preferably at least 90 wt % and most preferably the cell wall material consists essentially of microfibrils. Here, the wt-% is based on the dry weight of the cell wall material and the microfibrils.

Plant cell walls, especially in parenchymal tissue contain hemicelluloses and pectin in addition to cellulose. Thus, the microfibrils in the cell wall material may typically comprise cellulose, hemicellulose, and pectin. However, the cell wall material of the invention does not necessarily contain hemicellulose and/or pectin. The hemicellulose or part thereof may have been removed when the cell wall material is prepared from the plant parenchymal tissue. Therefore, the cell wall material of the invention optionally comprises hemicellulose, like for example in an amount of 0 to 40 wt %. Preferably the cell wall material comprises hemicelluloses, preferably in an amount of up to 40 wt %, like for example from 5 to 40 wt %, and more preferably in an amount from 10 to 30 wt %.

Likewise the pectin or part thereof may have been removed when the cell wall material is primary cell wall material prepared from the plant parenchymal tissue. Therefore, the cell wall material of the invention optionally comprises pectin, like for example in an amount of 0 to 35 wt %. Preferably the cell wall material comprises pectin, preferably in an amount of up to 30 wt %, like for example from 5 to 30 wt %, and more preferably in an amount from 10 to 20 wt %.

Preferably the cell wall material of the invention comprises hemicelluloses and pectin.

In general, if cell wall material is subjected to shear forces, this leads to structural changes. The more shear energy is applied, the more the cell wall structure is taken apart. The cell wall material in the preparation of the invention comprises cell wall material that is at least delaminated, that is, sufficient shear has been supplied to decompose the cell wall, as understood by the skilled person. If the cell wall material is subjected to more shear energy, this results in defibrillation, i.e. a stage at which the microfibrils that make up the fibres present in the cell wall are at least partially disentangled without breaking them. Delamination is one of the factors that affects the openness (and consequently the $S_{BET}$) of the fibrous preparation as it is used in the present invention. Without wishing to be bound by theory, it is believed that the higher the degree of delamination or defibrillation, the higher the $S_{BET}$ is that can be obtained for a fibrous preparation. In order to realise a weight-effective porous network-like structure that maintains its porosity, it is desirable that the microfibrils are separated/disentangled such that they yield relatively long yet relatively thin fibrils. Therefore, the fibrous preparation of the invention preferably is a fibrous preparation of defibrillated cell wall material. Thus, the cell wall material is preferably not only delaminated but also defibrillated.

Preferably the average length of the microfibrils from the defibrillated cell wall material is therefore more than 1 micrometer and preferably more than 5 micrometers.

Preferably, at least 80 wt % of the microfibrils is smaller than 50 nm in diameter. More preferably at least 80 wt % of the microfibrils is smaller than 40 nm in diameter, even more preferably smaller than 30 nm, even more preferably smaller than 20 nm and still more preferably smaller than 10 nm. The microfibril diameter can be suitably determined using the method described WO 2014/095323 A1.

The cell wall material is suitably defibrillated by subjecting it to mechanical energy and/or cavitation thereby disentangling the cellulose microfibrils in an aqueous medium as known by the skilled person. This can be done as part of the process for obtaining the microfibrils from the cell wall material, thus resulting in isolated defibrillated cell wall material comprising microfibrils. The required level of defibrillation can also be arrived at by a succession of various such disentanglement treatments, for example by first subjecting a dispersion of the cell wall material to a high shear treatment, and at later stage subjecting the resulting dispersion to another high shear treatment, possibly involving additional washing or similar treatment steps in between.

The cellulose in primary cell wall material generally has a lower degree of crystallinity. Therefore, the cellulose in the microfibrils in the defibrillated cell wall material in any of the compositions of the present invention preferably has an average degree of crystallinity of less than 50%. Preferably the average degree of crystallinity of the cellulose in the microfibrils is less than 40%, more preferably less than 35% and even more preferably less than 30%. The table below shows the average degree of crystallinity of typical sources of cellulose microfibrils. It shows that the cellulose in primary cell wall material sourced from plant parenchymal tissue typically has a degree of crystallinity of less than 50 wt-%.

TABLE 1

Average degree of crystallinity of cellulose
(all polymorph cellulose I)

| Source | Average degree of crystallinity (%) |
|---|---|
| Tomato fibers | 32 |
| Citrus fiber (Citrus Fiber AQ + N) | 29 |
| Nata de Coco | 74 |
| Cotton | 72 |
| Wood pulp fiber (Meadwestvaco) | 61 |
| Sugar beet fibre (Nordix Fibrex) | 21 |
| Pea fibres (PF200vitacel) | 42 |
| Oat fibres (780 Sunopta) | 43 |
| Corn hull (Z-trim) | 48 |
| Sugar cane Fiber (Ultracel) | 49 |

The average degree of crystallinity can be suitably determined according to the method described in WO 2014/095323 A1.

Surprisingly, the cell wall material of the present invention could be made suitable for use in oil phases. No chemical treatment (such as hydrophobisation, or similar funtionalisation or likewise derivatisation) is required. Therefore the microfibrils in the cell wall material preferably have not undergone any chemical treatment.

Fibrous Preparation

The fibrous preparation is suitably characterised by its specific surface area, because the favourable properties provided to the composition of the invention by the fibrous preparation relates to its openness and therefore its specific surface area. The specific surface area can suitably be quantified by the related property $S_{BET}$ as explained below. Accordingly, the fibrous preparation of the composition according to the first aspect of the invention has a specific surface area corresponding to an $S_{BET}$ of at least 5 m$^2$/g. The $S_{BET}$ is determined using the method described herein below. $S_{BET}$ is expressed in square metres per gram of material. As explained in the description of the method below, $S_{BET}$ is the specific surface area as determined from adsorption/desorption isotherms, based on the Brunauer-Emmet-Teller theory and using nitrogen (N$_2$) as the sample gas. For practical reasons, the $S_{BET}$ of the fibrous preparation is determined for the isolated fibrous preparation, i.e. typically before it is contacted with the other constituents of the oil phase it is dispersed in. It is believed that contacting the fibrous preparation with the hydrophobic carrier affects the specific surface area of the fibrous preparation only to a limited extent if at all. Therefore $S_{BET}$ is suitable to characterise the fibrous preparation even after it has been contacted with the remainder of the oil phase.

The higher the specific surface area, the better the structuring is. Therefore, the fibrous preparation preferably has a specific surface area corresponding to an $S_{BET}$ of at least 6, more preferably at least 10, even more preferably at least 15, and still more preferably at least 18 m²/g. Thus, the fibrous preparation preferably has a specific surface area corresponding to an $S_{BET}$ of between 5 and 40 m²/g, more preferably between 10 and 35 m²/g and even more preferably between 15 and 30 m²/g.

During manufacture of the composition according to any aspect of the invention the fibrous preparation is contacted with at least part of the oil phase in order to disperse it in that phase. At that stage, the fibrous preparation that is used in the present invention should be dried, because in contrast to cell wall material which is wet (with water), a dried fibrous preparation of the material is readily dispersed when it is contacted with the hydrophobic carrier of the oil composition. Therefore, the fibrous preparation preferably has a water content of at most 20 wt %, more preferably at most 10 wt % and even more preferably at most 5 wt % relative to the weight of the preparation, at least at the stage at which the fibrous preparation is contacted with the oil phase. The water content is determined by the method as described below. In general, the fibrous preparation may be dried using any suitable technique, as long as the required openness is obtained. It is believed that during proper drying—especially in case the cell wall material had been defibrillated to a large extent—the individual microfibrils may agglomerate, at least to some extent, into larger structures, but these structures maintain a sufficient degree of openness, as suitably characterised by the $S_{BET}$.

The degree of openness of the fibrous preparation may also be described by the Microfibril Availability Parameter (MAP), which is an NMR-based measure of the degree of delamination/defibrillation of the fibrous preparation as explained herein below. The fibrous preparation preferably has a Microfibril Availability Parameter (MAP) of at least 1.0 Hz, more preferably at least 1.10 Hz, even more preferably at least 1.20 Hz, still more preferably at least 1.30 Hz and yet more preferably at least 1.35 Hz, especially when the fibrous preparation is based on citrus fibre material.

A suitable way of preparing the fibrous preparation involves delaminating or defibrillating the cell wall material in an aqueous medium as explained above. Delamination, and to a larger extent defibrillation leads to an aqueous dispersion of the cell wall material, in which the disentangled microfibrils are distributed in the aqueous phase forming a relatively open network structure. According to the second aspect of the invention, it was found that it is possible to prepare a fibrous preparation of cell wall material that is suitable for use in the composition of the invention, if such a dispersion of delaminated cell wall material is dried but retains the openness of said material in the aqueous defibrillation medium. This can be arrived at by various drying techniques known to the skilled person. A typical, but non-limiting example is rapid freezing followed by freeze-drying. Here, the dispersion is rapidly frozen first, preferably at such a rate of freezing that upon freezing the ice crystals remain small enough so as to not appreciably collapse the fibre dispersion. Next, the frozen material is freeze dried. By sublimation of the ice, the collapsing effect of capillary forces between the microfibrils in an evaporating liquid medium is avoided.

Other methods of drying that yields a preparation of cell wall material of sufficient porosity are contemplated too. These methods include for example the method disclosed in US 2012/0090192.

The fibrous preparation used in the present invention preferably is in particulate form. The particulate form may be a direct result of the manufacturing method used to obtain the fibrous preparation, or it may be realised or modified by a size reduction treatment, including for example grinding. Therefore, the fibrous preparation preferably is ground.

The fibrous preparation may be ground before it is contacted with the oil phase. Alternatively, or even additionally, a size reduction step may also be carried out after a the fibrous preparation was dispersed (at a relatively course size) in at least part of the oil phase.

The particle size of the fibrous preparation in dry form is generally hard to determine, in view of the fluffy nature of such material. However, if the fibrous preparation is dispersed in a hydrophobic liquid, it may readily be analysed by sieving and the weight fractions of different sizes may be determined by use of consecutive sieves of varying mesh size. Thus, it is particularly preferred that the fibrous preparation is in particulate form wherein upon sieving a dispersion containing between 0.05 and 0.2 wt-% of the fibrous preparation in a hydrophobic liquid, at least 70 wt % of the fibrous preparation passes a sieve with apertures of 500 μm and not more than 30 wt % of the fibrous preparation passes a sieve with apertures of 125 μm.

During the sieving, the hydrophobic liquid preferably is a triglyceride oil, more preferably it is sunflower oil.

Preferably, at least 80 wt % of the fibrous preparation passes a sieve with apertures of 500 μm and not more than 20 wt % of the fibrous preparation passes a sieve with apertures of 125 μm.

Composition Comprising the Fibrous Preparation

According to the invention, the fibrous preparation is surprisingly used to modify the rheological properties of an oil phase. Thus, the oil phase can be thickened or even structured. Therefore, the oil phase of the composition according to the invention preferably is a structured oil phase. It is clear to the skilled person that the amount of the fibrous preparation that is used in the oil phase depends on the particular application and the desirable extent of rheological modification or structuring. A composition may also comprise other components which contribute to the overall rheological properties and/or structuring.

Without wishing to be bound by theory, it is believed that the structuring capability of the fibrous preparation is due to its capacity to build a space-filling (percolating) network of cell wall material with a large degree of openness within the oil phase. Thus, surprisingly, the fibrous material, which—in principle—is hydrophilic in nature does not precipitate, aggregate, flocculate or collapse in the hydrophobic oil phase. The oil phase in the composition according to the invention preferably comprises from 0.1 to 5 wt-%, more preferably from 0.2 to 4 wt-%, even more preferably from 0.5 to 3 wt-% of the fibrous preparation.

Alternatively, the oil phase preferably comprises the fibrous preparation in an amount which provides the composition with a storage modulus G' of at least 100 Pa, more preferably at least 500 Pa, even more preferably at least 1000 Pa and still more preferably at least 1500 Pa. Here, both the possibility that substantially only the fibrous preparation contributes the G' of the composition and the possibility that other components of the composition also make a contribution to the G' of the composition are envisaged.

It was surprisingly found that the fibrous preparation can render the composition of the invention non-flowable. Thus, the composition preferably is a non-flowable composition. A composition is considered non-flowable if a sample of the composition is placed in a jar and no flow is observed upon turning the jar upside down.

The benefits of structuring the oil phase of the composition according to the present invention may advantageously also be exploited to structure or rheologically modify the oil phase of compositions that also comprise optional additional components or additional phases. However, the composition may also be a composition which essentially consists of the oil phase with the fibrous preparation dispersed therein. Thus, it is preferred that the composition comprises at least 5 wt %, more preferably at least 10 wt %, even more preferably at least 50 wt %, even more preferably at least 70 wt-%, even more preferably at least 80 wt % and still more preferably at least 90 wt % the oil phase with respect to the weight of the composition.

Thus, it is preferred that the composition according to the invention is an edible composition comprising at an oil phase in an amount of at least 80% by weight of the total composition and a fibrous preparation of primary cell wall material in an amount of between 0.5 and 4% by weight of the oil phase, wherein the fibrous preparation is dispersed in said oil phase, wherein the primary cell wall material is citrus fibre, tomato fibre, sugar cane fibre, sugar beet fibre or a combination thereof and wherein said fibrous preparation has a porosity corresponding to a specific surface area $S_{BET}$ of at least 5 m$^2$/g, preferably at least 10 m$^2$/g and even more preferably at least 15 m$^2$/g.

Method

According to the third aspect, the present invention also provides a method for the preparation of a composition comprising a structured oil phase, wherein the method comprises the steps as specified hereinabove. The method preferably is a method for the preparation of a composition according to the invention. Therefore, the examples and preferences with regard to the cell wall material, the fibrous preparation, the oil phase and any of the other components of the composition according to the invention also apply with regard to this method and the composition prepared by it.

Step c of the process involves at least delaminating said cell wall material in an aqueous medium. This treatment involves subjecting the cell wall material to mechanical shearing and/or cavitation. To this effect, the treatment may include a shear mixing step, such as treatment with a Silverson overhead mixer or inline mixer. At higher shear, the delaminated material can also become defibrillated material. It is preferred that the delaminated cell wall material is defibrillated. Therefore, the treatment preferably includes a high shear treatment step selected from high pressure homogenisation at a pressure of between 500 and 2000 bar and microfluidising at a pressure of between 500 and 2000 bar. These treatments are favourably combined with a shear mixing pre-treatment, for example with a mixer like a Silverson mixer. Both high pressure homogenisation and microfluidisation are well-known techniques, involving well-known equipment. Preferably, the high shear treatment step is high pressure homogenisation as specified, more preferably, it is high pressure homogenisation at a pressure of between 500 and 1000 bar, and even more preferably at a pressure of between 600 and 800 bar. Thus, it is especially preferred that the aqueous medium of step c. comprises between 0.5 and 4 wt-% of the cell wall material and the high shear treatment step of step iii is high pressure homogenisation at a pressure of between 600 and 800 bar.

The precise pressure and the number of passes and/or stages of the treatment—be it shear mixing, high pressure homogenisation or microfluidisation—that is required to obtain the benefits of the present invention may depend for instance on the concentration of the cell wall material present and on its level of comminution/pre-treatment before this step, but is easily determined by experimentation.

Step d involves drying the dispersed defibrillated cell wall material so as to obtain a dried fibrous preparation of cell wall material. As explained above, the fibrous preparation is suitably characterised by its $S_{BET}$. The dried fibrous preparation preferably has an $S_{BET}$ of at least 5 m$^2$/g, more preferably at least 6, more preferably at least 10, even more preferably at least 15, and still more preferably at least 18 m$^2$/g. The dried fibrous preparation preferably has an $S_{BET}$ of between 5 and 40 m$^2$/g, more preferably between 10 and 35 m$^2$/g and even more preferably between 15 and 30 m$^2$/g.

In order to arrive at the desired openness, the drying method suitably includes a freezing step, which is sufficiently rapid to suppress the growth of water ice crystals that would lead to at least partial collapse of the structure of the delaminated cell wall material in the dispersion medium. Subsequently, the drying typically involves removal of the dispersion medium still whilst avoiding collapse of the defibrillated cell wall material.

The fibrous preparation in step d should be dried. Therefore, the dried fibrous preparation preferably has a water content of at most 20 wt %, more preferably at most 10 wt % and even more preferably at most 5 wt % relative to the weight of the preparation, at the stage at which the fibrous preparation is contacted with the oil phase.

Step e involves combining the fibrous preparation with said at least part of the oil phase. Advantageously, the combining step includes dispersing the fibours preparation in said at least part of the oil phase so as to form a structured oil phase. Typically, such dispersion involves only very little agitation, mild agitation, mild shear. Under many practical conditions, mild stirring suffices to generate structured structure upon combining the fibrous preparation and the oil phase.

The fibrous preparation may be ground before it is contacted with the at least part of the oil phase. Alternatively, or additionally, a size reduction step may also be carried out after the fibrous preparation was dispersed (at a relatively course size) in at least part of the oil phase.

The invention also relates to a composition obtainable by the method according to the invention.

The method preferably is a method for preparing a composition according to the first or the second aspect of the invention. Consequently, it is also preferred that the composition according to the first or according to the second aspect of the invention is obtainable by this method for the preparation of a composition comprising a structured oil phase.

Use According to the Invention

In a fifth and sixth aspect, the invention also relates to use of a fibrous preparation of delaminated cell wall material as defined hereinbefore. The examples and preferences with regard to the cell wall material, the fibrous preparation, the oil phase and any of the other components of the composition according to the invention also apply with regard to this use according to the invention.

EXAMPLES

The invention is illustrated by means of the following non-limiting examples.

Characterization Methods

Moisture Content

Moisture content is calculated from the weight loss measured after heating samples to 100° C. for 16 hours (in vacuum).

BET Analysis

The BET-based specific surface area ($S_{BET}$) was deduced from $N_2$ (nitrogen) adsorption and desorption isotherms using the BET (Brunauer, Emmet and Teller) theory [see e.g. S. J. Gregg, K. S. W. Sing, *Adsorption, Surface area and Porosity*, $2^{nd}$ ed. Academic Press, London, 1982]. Prior to the adsorption measurements fibre samples were degassed in vacuum at 100° C. for 16 hours. The sample cell holding the outgassed sample was evacuated and isotherms were recorded at a temperature of −196° C. (77 K) using a Micromeritics Tristar 3000 gas sorption analyzer. Portions of nitrogen gas were dosed into the sample cell and were partly adsorbed on the surface, eventually getting into equilibrium with the gas phase. In this way adsorption and desorption points could be recorded at different pressures and the adsorption and desorption isotherm could be constructed. Adsorbed nitrogen generally first forms a monolayer on the sample surface while further increase in pressure results in the formation of multilayers. In the region where monolayers and multilayers were formed, the $S_{BET}$ was determined according to the BET theory. Adsorption points in the relative pressure range between 0.05 and 0.25 were typically used.

MAP—Sample Preparation

The Microfibril Availability Parameter is a measure for the level of activation or defibrillation of activated plant cell wall material in aqueous medium. The MAP is based on the well-known $R_2$ relaxation rate, determined by NMR.

For each sample, 1.2 grams of the dry fibrous preparation was dispersed in 148.8 grams of Millipore water to yield a suspension with a concentration of 0.80 wt % of cell wall material. Dispersion was carried out using a Silverson mixer (3000 rpm, 2 minutes, fine Emulsor screen with round holes of 2 mm diameter). The pH was adjusted with 10 wt % citric acid solution to pH 3.3±0.1. An aliquot of the sample was then transferred to an NMR measurement tube (10 mm diameter, filling height 1 cm). Reference samples for background correction are prepared as follows.

An aliquot of the resulting concentration- and pH-standardised sample was transferred directly to an 18 cm flat bottom NMR tube of 10 mm diameter at a filling height of 1 cm. In order to do a background correction, another aliquot was centrifuged (Eppendorf Centrifuge 5416) at a relative centrifugation force of 15000 for 10 min. in a 2 ml Eppendorf cup, from which the top layer without fibre (matrix) was subsequently transferred to another 18 cm flat bottom NMR tube at a filling height of 1 cm, which we refer to as a matrix reference sample. Both samples and matrix reference samples were incubated and equilibrated at 20° C. for 10 min. prior to the measurement.

MAP ($R_2$)—Measurements

CPMG relaxation decay data were collected for each sample and for each matrix reference sample. A Bruker MQ20 Minispec was deployed operating at a resonance frequency for protons of 20 MHz, equipped with a variable temperature probehead stabilised at 20° C. Measurements were performed using a CPMG (Carr Purcell Mayboom Gill) T2 relaxation pulse sequence to observe the relaxation decay at 20° C. (See Effects of diffusion on free precession in nuclear magnetic resonance experiments, Carr, H. Y., Purcell, E. M., Physical Review, Volume 94, Issue 3, 1954, Pages 630-638/Modified spin-echo method for measuring nuclear relaxation times, Meiboom, S., Gill, D., Review of Scientific Instruments, Volume 29, Issue 8, 1958, Pages 688-691). Data were collected with the 180° pulse spacing set to 200 μs, a recycle delay time of 30 sec., a 180°-pulse length of 5 μs (microseconds) and using 14.7 k 180°-pulses. The sequence deploys a phase cycle and complex mode detection. Prior to measurement, the suitability of the NMR system for these measurements (in terms of field homogeneity etc.) was checked by verifying that the T2* of pure water was >2 ms. The sample temperature was kept constant at 20° C. throughout each measurement.

MAP ($R_2$)—Data Analysis

Data were processed with Matlab using a singular value decomposition to phase correct the quadrature data (see: "Towards rapid and unique curve resolution of low-field NMR relaxation data: trilinear SLICING versus two-dimensional curve fitting", Pedersen, H. T., Bro, R., Engelsen, S. B., *Journal of Magnetic Resonance*. August 2002; 157(1), Pages 141-155. DOI: 10.1006/jmre.2002.2570). The resulting, phase-corrected data were Inverse Laplace Transformed into a $T_2$ distribution curve using the Matlab non-negative least square constraints function lsqnonneg (Lawson, C. L. and R. J. Hanson, *Solving Least Squares Problems*, Prentice-Hall, 1974, Chapter 23, p. 161) with boundaries set for $T_2$, requiring $T_2$ to be in the range of 0.01 to 10 seconds and with the regularisation parameter lambda set to 0.2.

For every sample, the data were treated as follows to obtain the MAP: In the $T_2$ distribution curve for a particular sample, the peak corresponding to the water protons of which $T_2$ is averaged by exchange between the bulk water phase and the surface of the dispersed and activated cell wall material was identified. It is believed that the exchange (and resulting averaging) is due to diffusion and chemical exchange between bulk and cellulose surface sites. In the present case, the peaks of the bulk water phase were easily distinguished, as they were the peaks with the highest intensity. The peak corresponding to the bulk water phase in the matrix reference sample was similarly identified.

The average $T_2$ value was determined by calculating the intensity-weighted average of the peak.

$R_2$ is defined as the inverse of this average $T_2$, i.e. $R_2=1/T_2$ and is expressed in Hz. The microfibril availability parameter MAP for a given sample is calculated as the difference between $R_2$ of the sample and $R_2$ of the matrix reference sample:

$$MAP = R_2(\text{sample}) - R_2(\text{matrix reference})$$

Thus, MAP is a measure for the bulk water interaction with the available microfibril surface (K. R. Brownstein, C. E. Tarr, *Journal of Magnetic Resonance* (1969) Volume 26, Issue 1, April 1977, Pages 17-24).

Determination of Particle Size (Fibrous Preparation)

The particle size distributions of the fibrous preparations were analysed by a wet sieving method. A sample of dry fibrous preparation was dispersed in sunflower oil (fully refined and winterised, ex Unilever Rotterdam) at a concentration of 0.1 wt % by gentle stirring. The dispersion was passed through a set of 5 steal sieves (ex Retsch, Germany), with apertures of 710 μm, 500 μm, 355 μm, 200 μm and 125 μm, respectively, starting with the sieve of the largest aperture.

Examples 1 to 8: Fibrous Preparations of Cell Wall Material

Fibrous preparations of cell wall material were prepared from different sources of cell wall material. Citrus fibre (Herbacel AQ Plus ex Herbafood) and sugar cane fibre (Ultracel ex Watson) were commercially sourced. Tomato fibres were prepared as described in Example 6 of WO 2014/095342 A1.

Citrus fibre and tomato fibre are primary cell wall material, sugar can fibre is believed to be a source of both primary and some secondary cell wall material. The composition and manufacturing details of the dry fibrous preparations of Examples 1 to 8 and Comparative Examples A, B, and C are summarised in Table 2.

Fibre Activation

Citrus fibres (Ex. B, C and 1 to 6) were dispersed in Millipore water at a concentration of 2 wt % and pre-activated using a high shear mixer (Silverson, 4100 rpm, 10 min, fine emulsor screen). For Ex. B, C, and Ex. 1, the resulting pre-activated fibres were transferred to a microfluidizer (model M-110P, Microfluidics Inc, Z-shaped chamber) and homogenised at 1200 bar (1 pass). For Ex. 3 to 6, the pre-activated fibres were transferred to a high pressure homogenizer (Niro Soavi) and homogenized at 100, 300, 500 and 800 bar (1 stage, 1 pass), respectively.

Sugar cane fibres (Ex. 7) were dispersed in Millipore water at a concentration of 2 wt % and pre-activated using a high shear mixer (Silverson, 4100 rpm, 10 min, fine emulsor screen). The pre-activated fibres were transferred to a high pressure homogenizer (Niro Soavi) and homogenized at 800 bar (1 stage, 1 pass).

Tomato fibres (Ex. 8) were washed prior to activation to remove soluble salts and sugars. Fibre concentrate was mixed with Millipore water (ratio=1:5) and centrifuged at 10.000×g during 20 minutes (500 ml centrifuge bottles, Beckman Coulter Avanti J-26S XP centrifuge). The sediment was collected and the supernatant phase was discarded. The washing procedure was repeated one more time. The sediment (containing tomato fibres) was collected and diluted with Millipore water (ratio=1:5). The Fibres are activated using a high-shear mixer (Silverson, 6000 rpm, 10 min, fine emulsor screen). Viscosity increases during shearing. No homogenization step is used in this case as homogenization is observed to reduce viscosity of the tomato fibre slurry.

Freezing of Fibre Suspensions

Liquid nitrogen-freezing (flash freezing) (Ex. 1 to 8): ca 1 kg of the suspension of activated fibres was added dropwise to ca. 10 litres of liquid nitrogen (contained in a polystyrene box) using a 50 ml syringe. Frozen fibre pieces were removed from the liquid nitrogen and transferred to a freeze dryer.

Blast freezing (Ex. C): a portion of the fibre suspension was spread evenly on a (pre-cooled) stainless steel tray and cooled down to ca. −30° C. in a blast freezer (Hobart Foster Holland BV, the Netherlands). Because of air circulation, freezing in a blast freezer proceeds faster than in a freezing cabinet (at −30° C.), but not as fast as in liquid nitrogen. The suspension was kept in the blast freezer for at least 3 hours before transferring to a freeze dryer.

Drying of Fibre Suspensions

Freeze drying (Ex. C and 1 to 8): frozen fibre suspensions were freeze-dried using a Zirbus Sublimator 3×4×5 freeze dryer (Zirbus Technology GmbH, Germany) with a programmable shelf temperature. Shelves were cooled to −30° C. before samples were placed in the freeze dryer The following time-temperature profile was used: 395 minutes at −30° C., 30 minutes at −20° C., 30 minutes at −10° C., 30 minutes at 0° C., 30 minutes at 10° C., 30 minutes at 30° C. and 1830 minutes at 40° C. The condenser temperature was set to −75° C. Freeze-drying was carried out at a pressure of 0.15 mbar. Alternatively, a Labconco Freezone (6 Litre) Freeze Dry System (model: 7934031; Labconco, US) was used. In this case the temperature of the shelf was not actively controlled. The condenser temperature was −80° C. and the pressure was 0.016 mbar. Drying continued for ca. 5 days.

Thus, drying was continued until the sample weight did not decrease anymore.

Air drying (Ex. B): fibre suspensions were air-dried using a Mitchell 10 tray drying cabinet. Air was heated to 60° C. by means of electric heating elements and circulated at an average speed of about 0.5 m/s.

Freeze- and air-dried materials were ground to a powder using an electronic coffee grinder (De'Longhi KG49).

TABLE 2

| Example | Fibre | Activation | Freezing | Drying |
|---|---|---|---|---|
| Ex. A | Citrus | Raw material as obtained from supplier | | |
| Ex. B | Citrus | Silverson + microfluidizer | None | Air |
| Ex. C | Citrus | Silverson + microfluidizer | Blast[b] | F.D.[a] |
| Ex. 1 | Citrus | Silverson + microfluidizer | LN2[c] | F.D. |
| Ex. 2 | Citrus | Silverson | LN2 | F.D. |
| Ex. 3 | Citrus | Silverson + 100 bar HPH[d] | LN2 | F.D. |
| Ex. 4 | Citrus | Silverson + 300 bar HPH | LN2 | F.D. |
| Ex. 5 | Citrus | Silverson + 500 bar HPH | LN2 | F.D. |
| Ex. 6 | Citrus | Silverson + 800 bar HPH | LN2 | F.D. |
| Ex. 7 | Sugar cane | Silverson + 800 bar HPH | LN2 | F.D. |
| Ex. 8 | Tomato | Silverson | LN2 | F.D. |

[a]F.D. = freeze drying
[b]blast = blast freezer
[c]LN2 = flash freezing in liquid nitrogen
[d]HPH = high pressure homogenisation Characteristics of the Dry Preparations Moisture contents, specific surface areas (SBFT) and the microfibril availability parameter MAP are summarized in Table 3.

TABLE 3

| Example | Moisture (%) | $S_{BET}$ ($m^2 \cdot g^{-1}$) | MAP (Hz) |
|---|---|---|---|
| Ex. A | 8.4 | 0.9 | 0.97 |
| Ex. B | 1.4 | 0.4 | 1.19 |
| Ex. C | 3.1 | 1.2 | 1.14 |
| Ex. 1 | 0.4 | 27.9 | 1.42 |
| Ex. 2 | 7.2 | 6.7 | 1.09 |
| Ex. 3 | 1.5 | 10.6 | 1.14 |
| Ex. 4 | 3.9 | 16.1 | 1.18 |
| Ex. 5 | 5.0 | 18.7 | 1.25 |
| Ex. 6 | 9.6 | 18.6 | 1.38 |
| Ex. 7 | 3.9 | 20.7 | 1.64 |
| Ex. 8 | 5.0 | 22.9 | |

BET Analysis

The $N_2$ adsorption and desorption isotherms obtained in the BET analysis for Examples 1 to 7 were Type II isotherms, typical for non-porous and/or macroporous materials. Example 8 shows a minor hysteresis loop, more indicative of a Type IV isotherm, suggesting that this sample is meso/macroporous.

Particle Size

The analysis of a sample of Example 1 by the wet-sieving method is summarized in Table 4.

TABLE 4

| Sieve of aperture size | observation |
| --- | --- |
| 710 μm | Virtually all particles pass |
| 500 μm | About 10 wt % of particles remain on this sieve |
| 355 μm | About 40 wt % of particles remains on this sieve |
| 200 μm | About 40 wt % of particles remains on this sieve |
| 125 μm | About 10 wt-% of particles remains on this sieve |
| Pan | Clear oil without visible particles |

Thus, at least about 70 wt % of the particles have a size of between 200 μm and 500 μm.

Examples 9 to 18: Structured Oil Compositions

Preparation

Structured oil compositions were made using sunflower oil (fully refined and winterised, ex Unilever Rotterdam), diglyceride oil (Econa cooking oil, ex Kao Corporation (Japan), containing at least 50 wt % diacylglycerides (DAG)), and silicone oil (Xiameter PMX-200 Silicone Fluid, 100 CS, ex Dow Corning Corporation, Michigan), respectively. The structured oil compositions (batch size 30 g) were made by manually dispersing the dry fibre preparations of Ex. A, B, C, and 1 to 8 into liquid oil using a spatula (no high-shear mixing device was needed). For each of the Comparative Examples D, E, and F and for each of the Examples 9 to 18, a series a series of samples was prepared, using fibre concentrations of 0.50%, 0.75%, 1.00%, 1.25%, 1.50%, 1.75%, 2.00%, and 2.50% (weight percent). The resulting structured oil samples were stored at 4° C. until analysis. The oils and fibres preparations used for each Example are listed in Table 5.

Characterisation

For each composition in each of the series of the Examples D, E, F and 9 to 18, the flowability at room temperature was evaluated by visual inspection by placing each sample (30 g) in a plastic jar (ca. 100 ml) and turning the jar upside down. Samples were ranked as either flowable or non-flowable, depending on whether flow is observed within 1 minute after turning jars upside down. Table 5 also lists the lowest concentration of fibres in each of the series, at which no flow was observed. Comparative Examples D, E, and F flowed even at the highest tested concentration of 2.5 wt %. This demonstrates that the citrus fibre as is (Ex. D) could not structure the sunflower oil. Likewise, citrus fibres that were activated, but had not been dried whilst retaining the open structure of the fibres in the activation medium (Ex. E and F) could not structure sunflower oil either. In contrast, Ex. 9 shows that citrus fibres which have been activated by microfluidisation, have been flash-frozen with liquid nitrogen and freeze dried are capable of structuring sunflower oil at comparatively low concentrations. A comparable result was obtained with citrus fibres activated with high pressure homogenisation at varying pressures (Ex. 11 to 14). Ex. 10 shows that even relatively mild activation of primary cell wall material (Silverson treatment only) gives satisfactory structuring of the sunflower oil, provided that the material was dried whilst retaining the open structure of the material in the activation medium. Ex. 15 and 16 demonstrate that various other sources of plant cell wall material can also be used to obtain a structured oil composition. Ex. 17 and 18 demonstrate that different oils can be structured using a fibrous preparation of plant cell wall material according to the present invention.

All samples that were non-flowable were stable for more than four months, in the sense that they demonstrated virtually no signs of settling of the fibrous preparation. This shows that the fibrous preparations provide structured oil phases with excellent storage stability.

The shear storage modulus (G') is a measure of a composition's tendency to be deformed elastically (i.e. non-permanently) when an oscillatory force is applied. G' is conveniently measured by small-deformation oscillatory measurements [see e.g. H. A. Barnes, J. F. Hutton and K. Walters, An introduction to Rheology, Amsterdam, Elsevier, 1989)]. Oscillatory measurements were performed using an AR2000 or AR G2 rheometer (TA Instruments) equipped with plate-plate geometry. A sandblasted sample cup (57 mm inner diameter, depth 2100 μm) was mounted on the lower plate of the rheometer. Sample loading was as follows: the sample cup was slightly overfilled and excess sample was removed by dragging the edge of a spatula across the top of the cup. The upper plate (sandblasted, 4 cm diameter) was then lowered to a distance of 2050 μm from the bottom of the sample cup. Oscillatory measurements were performed at 1 Hz frequency and 0.5% strain (within the linear viscoelastic region) at a temperature of 20° C. The G' was recorded during a period of 5 minutes (time-sweep measurement); the value of G' measured at t=5 min is reported in Table 6.

The results in Table 6 demonstrate that the structuring effect of the fibrous preparations of cell wall material according to the invention demonstrate appreciable structuring of the oils also at concentrations below the minimum concentration required for non-flowability. In contrast, the control and comparative examples demonstrate that materials which had not been activated, or had not been dried whilst retain the open structure of the material in the activation medium do not provide any structuring (Ex. A and B), or hardly any structuring (Ex. C).

TABLE 5

| Example | Oil | Fibre | No flow (wt %)[a] |
| --- | --- | --- | --- |
| Ex. D | SF oil | Ex. A | n.a. |
| Ex. E | SF oil | Ex. B | n.a. |
| Ex. F | SF oil | Ex. C | n.a. |
| Ex. 9 | SF oil | Ex. 1 | 1.25 |
| Ex. 10 | SF oil | Ex. 2 | 2.50 |
| Ex. 11 | SF oil | Ex. 3 | 1.75 |
| Ex. 12 | SF oil | Ex. 4 | 1.50 |
| Ex. 13 | SF oil | Ex. 5 | 1.50 |
| Ex. 14 | SF oil | Ex. 6 | 1.50 |
| Ex. 15 | SF oil | Ex. 7 | 1.25 |
| Ex. 16 | SF oil | Ex. 8 | 2.00 |
| Ex. 17 | Diglyceride | Ex. 1 | 1.25 |
| Ex. 18 | Silicone | Ex. 1 | 1.25 |

[a] lowest of the tested concentrations at which a composition was non-flowable

TABLE 6

| Example | Shear storage modulus G' (Pa) | | | | | | |
|---|---|---|---|---|---|---|---|
| | 0.5%[a] | 0.75%[a] | 1.0%[a] | 1.25%[a] | 1.5%[a] | 1.75%[a] | 2.0%[a] |
| Ex. D | 0 | 0 | 0 | 0 | 0 | 0 | 0 |
| Ex. E | 0 | 0 | 0 | 0 | 0 | 0 | 0 |
| Ex. F | 0 | 0.3 | 0.4 | 7.2 | 6.5 | 12.0 | 20.7 |
| Ex. 9 | 3.6 | 40.0 | 597 | 1747 | 1743 | 14480 | 15320 |
| Ex. 10 | 0.4 | 7.3 | 10.2 | 68.3 | 231 | 513 | 1389 |
| Ex. 11 | 1.9 | 18.4 | 43.9 | 255 | 452 | 4858 | 3537 |
| Ex. 12 | 1.8 | 40.0 | 123 | 1387 | 3128 | 8459 | 14310 |
| Ex. 13 | 1.7 | 28.3 | 193 | 1651 | 2963 | 7993 | 14990 |
| Ex. 14 | 2.8 | 45.4 | 279 | 1521 | 4450 | 9025 | 17990 |
| Ex. 15 | 26.1 | 189 | 1308 | 2244 | 6164 | 9571 | 16910 |
| Ex. 16 | 1.9 | 14.6 | 84.2 | 347 | 1108 | 2801 | 4366 |
| Ex. 17 | 3.6 | 35.4 | 254 | 977 | 5544 | 9794 | 19000 |
| Ex. 18 | 20.7 | 137 | 1750 | 3012 | 7064 | 14970 | 21390 |

[a]Weight percentage of cell wall material in oil

The invention claimed is:

1. A composition comprising an oil phase and a fibrous preparation of delaminated cell wall material dispersed in said oil phase, wherein the cell wall material is sourced from plant tissue, and wherein said fibrous preparation has a specific surface area corresponding to an $S_{BET}$ of at least 5 m$^2$/g,
wherein the delaminated cell wall material has an open network structure of fibers formed by liquid nitrogen freezing and freeze-drying,
wherein the cell wall material is citrus fibre, tomato fibre, sugar beet fibre, sugar cane fibre or a combination thereof; and
wherein the fibrous preparation is in particulate form and wherein the fibrous preparation is such that, when a dispersion containing between 0.05 and 0.2 wt-% of the fibrous preparation in a hydrophobic liquid is sieved, at least 70 wt % of the fibrous preparation passes a sieve with apertures of 500 µm and not more than 30 wt % of the fibrous preparation passes a sieve with apertures of 125 µm.

2. The composition according to claim 1, wherein the fibrous preparation has a specific surface area corresponding to an $S_{BET}$ of at least 15 m$^2$/g.

3. The composition according to claim 1, wherein the oil phase is a structured oil phase.

4. The composition according to claim 1, wherein the oil phase comprises a hydrophobic carrier wherein the hydrophobic carrier is an edible oil, a paraffin, a silicone oil or a combination thereof.

5. The composition according to claim 4, wherein the hydrophobic carrier is an edible oil.

6. The composition according to claim 5, wherein the hydrophobic carrier is a triglyceride carrier, a diglyceride carrier or a mixture of triglycerides and diglycerides.

7. The composition according to claim 1 wherein the oil phase comprises from 1 to 5 wt-% of said fibrous preparation.

8. The composition according to claim 1, wherein the hydrophobic liquid is sunflower oil.

9. The composition according to claim 1, wherein the hydrophobic liquid is a triglyceride oil.

10. The composition according to claim 1, wherein the delaminated cell wall material is a dried fibrous preparation that is directly incorporated into the oil phase upon contact therewith.

11. The composition according to claim 10, wherein the dried fibrous preparation has a water of content of 20 wt % or less.

* * * * *